Figure 1:
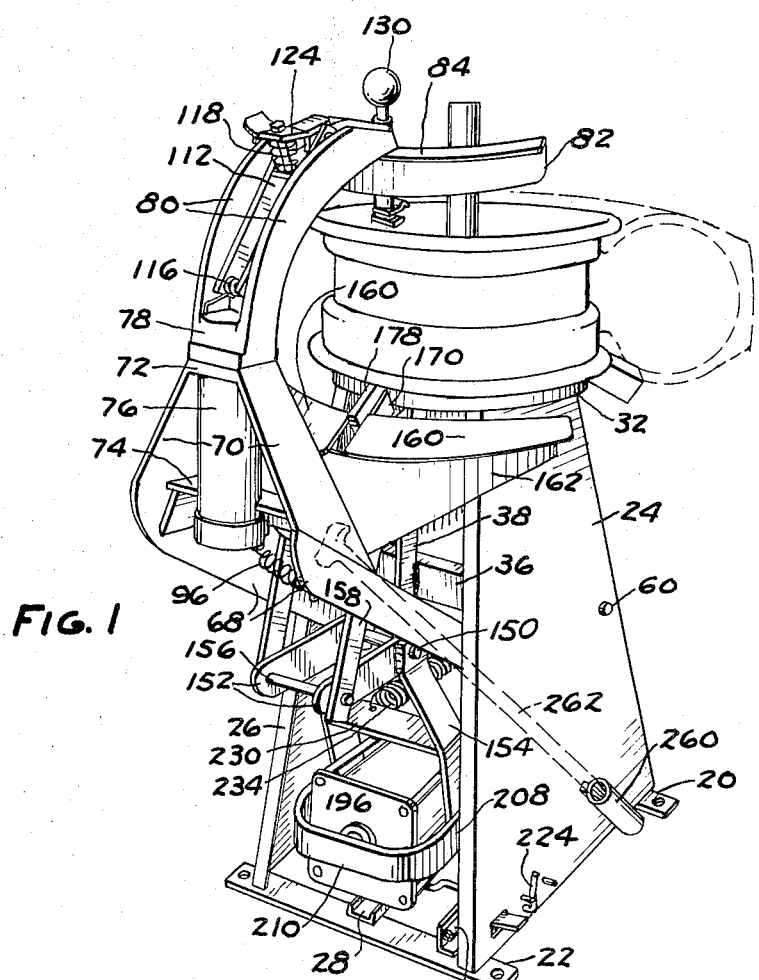

April 19, 1966 G. MAY 3,246,681
BEAD BREAKING APPARATUS FOR TIRE CHANGING MACHINE
Filed Nov. 9, 1962 4 Sheets-Sheet 1

INVENTOR.
GEORGE MAY
BY Barnes, Kisselle,
Raisch & Choate
ATTORNEYS

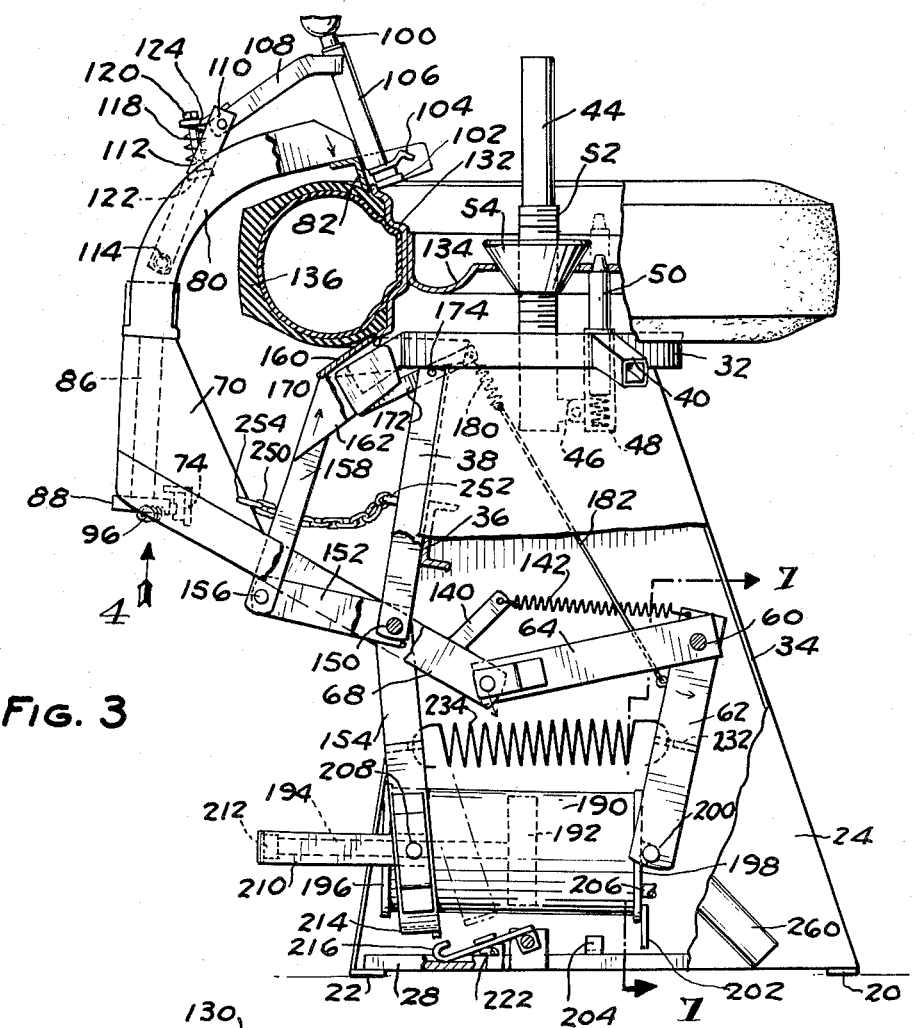
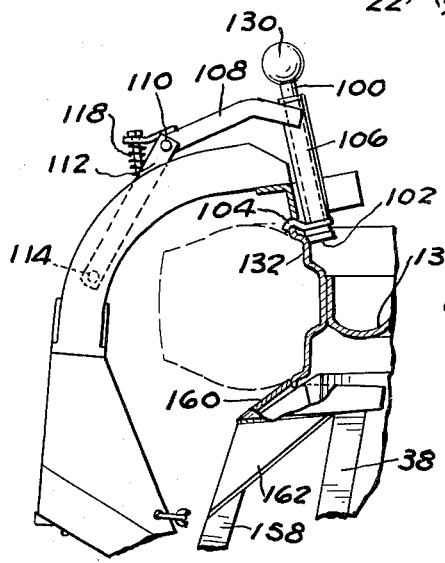
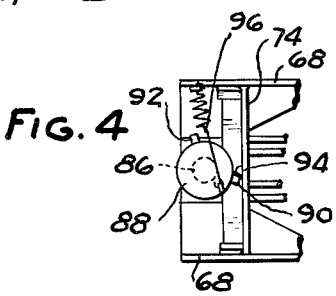

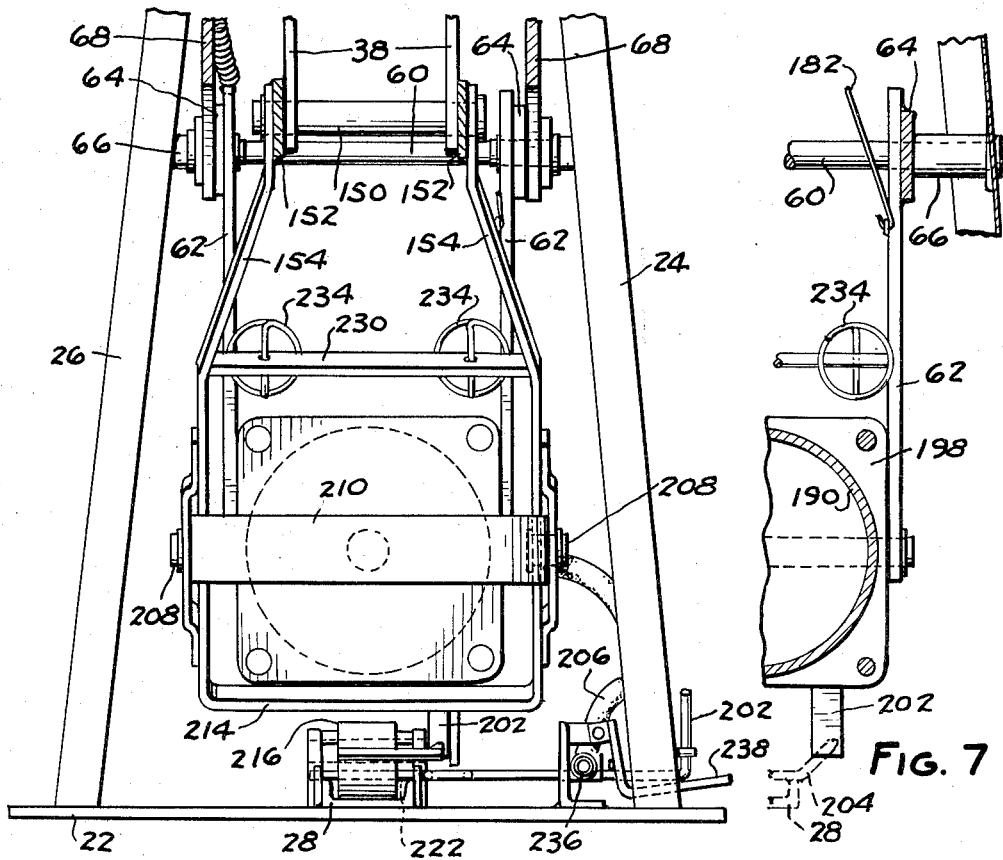
FIG. 6
FIG. 7
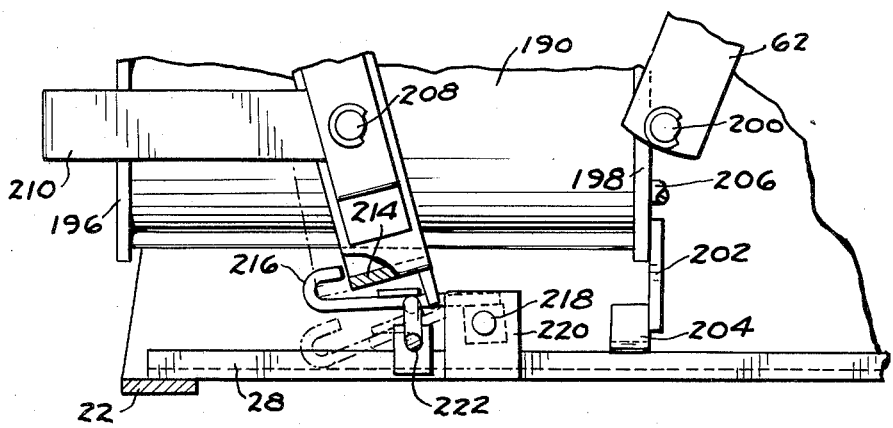
FIG. 8
INVENTOR.
GEORGE MAY
BY
Barnes, Kisselle, Raisch & Choate
ATTORNEYS

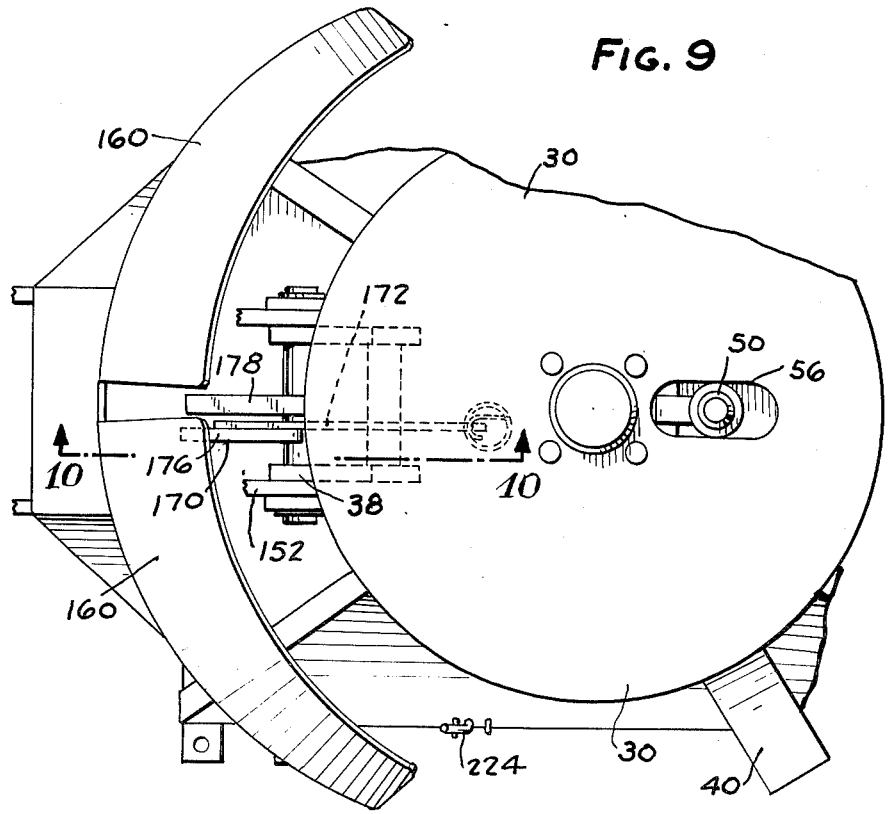
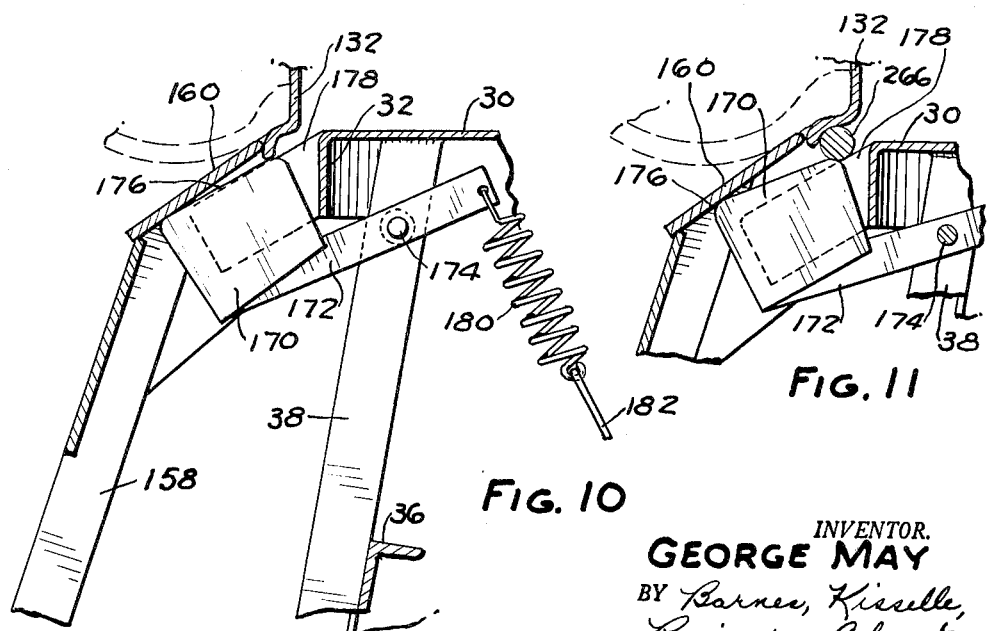

United States Patent Office 3,246,681
Patented Apr. 19, 1966

3,246,681
BEAD BREAKING APPARATUS FOR TIRE
CHANGING MACHINE
George May, Dearborn, Mich., assignor to FMC Corporation, San Jose, Calif., a corporation of Delaware
Filed Nov. 9, 1962, Ser. No. 236,528
13 Claims. (Cl. 157—1.28)

This invention relates to tire changing apparatus and more particularly to a power-operated, bead breaking machine which can be used for the mounting and dismounting of tires on wheels.

In garages and gas stations where tires are sold and repaired, it is essential that equipment be available to permit an operator to remove and replace a tire on a wheel with as much speed as possible since patrons who are buying new tires or having tires repaired are frequently in a hurry.

It is also important that the apparatus be adaptable to both tube tires and tubeless tires. With the adoption of more and more tubeless tires, the bead seal between the tire and the rim of the wheel is important and frequently facilitated by a very close contact between the bead of the tire and the rim. This has increased the problem of the breaking of the bead of a tire and the problem is also aggravated by the fact that the more recent so-called "low contour" tire has a very flexible side wall, and it is sometimes difficult to apply pressure to the tire bead without causing the collapse of the tire wall. It frequently happens also that in the removal of a tire, one bead will break much more easily than the other and it is essential that bead breaking mechanisms using joint pressures from each side of the tire be so arranged that one can be operated separately from the other.

It is an object of the present invention to provide a simple power-operated device which can apply pressure to both sides of the tire when in a horizontal position and which can apply pressure also selectively to each side of the tire upon a very simple manipulation by the operator.

It is another object to provide a mechanism of the type described wherein the operating parts may be readily removed from the operating area to facilitate the introduction and removal of the wheel and tire.

It is a further object to provide a mechanism wherein the lower bead pressure mechanism or pressure device is properly guided toward the tire automatically since this particular part is normally out of the area of observation of the operator.

A still further object is the provision of a bead breaking mechanism which can compensate for a collapse of the tire wall in a manner wherein the mechanism will not be destroyed or the tire injured.

Other objects and features of the invention relating to details of construction and operation will be apparent in the following description and claims.

Drawings accompany the disclosure and the various views thereof may be briefly described as follows:

FIGURE 1, a perspective view of the mechanism showing the relationship of the parts.

Figure 2:
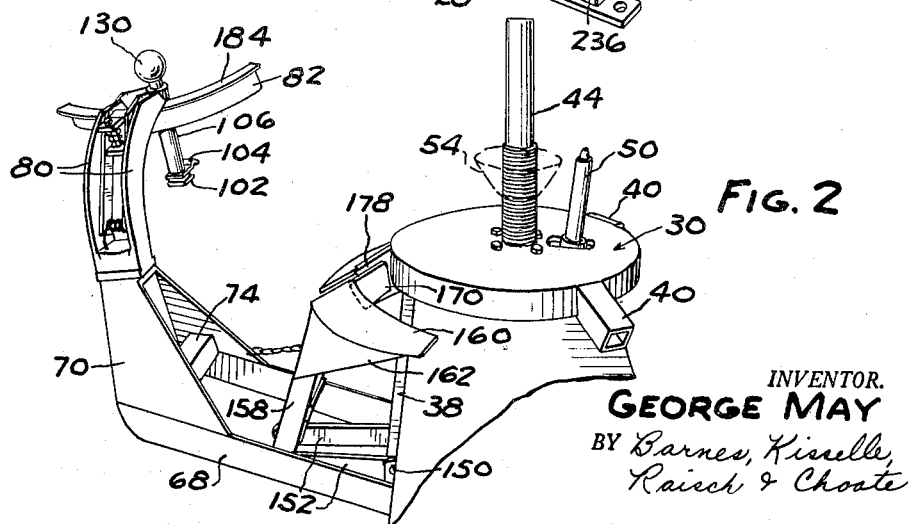

FIGURE 2, a view of the top of the mechanism showing the manner in which the upper bead breaker can be moved out of the tire area.

FIGURE 3, a vertical side elevation of the device showing the operating parts in position ready to break a tire.

FIGURE 4, a partial view taken at line 4 of FIGURE 3.

FIGURE 5, a view of the mechanism showing the upper breaker locked out.

FIGURE 6, a front view of the mechanism in the lower portion of the device.

FIGURE 7, a partial section on line 7—7 of FIGURE 3.

FIGURE 8, an enlarged view of the lower portion of the device as shown in FIGURE 3 to illustrate the bottom lockout mechanism.

FIGURE 9, a plan view of the bottom breaker.

FIGURE 10, a sectional view on line 10—10 of FIGURE 9 showing the breaker moved to the tire contact position.

FIGURE 11, a partial section showing the adaptation of the lower breaker in the event of an obstruction on the wheel.

The supporting frame

Referring to the drawings, in FIGURES 1, 2 and 3 the supporting frame of the mechanism is composed of two floor strips 20 and 22 fastened to side panels 24 and 26 and connected also by a central channel bar 28. The side panels 24 and 26 are rigidly connected at the top to a circular supporting plate 30 which has a depending annular flange 32. At the rear of the device, the side plates are connected and closed by a rear plate 34. The framework also includes a cross channel 36 at the forward edges of plates 24 and 26 upwardly of the base, this channel serving to support parallel bars 38 which anchor at the top at the plate 30 and which depend below the channel 36 to support a portion of the mechanism to be later described.

The top of the plate 30 serves as the main support for a tire wheel and at the rear portion thereof are two square tubes 40 extending radially outward and downward. These tubes are 120° apart on the plate and serve to support the edges of varying sized wheels which are centered on the plate 30. A central stud 44 is vertically anchored on the plate 30, a portion of the stud depending below the plate 30 and having a lug 46 to support a tube 48 which in turn supports a spring pressed stud 50 which serves to engage a lug hole to stabilize the wheel when mounted on the top plate. A portion of the stud 44 is provided with threads 52 which cooperate with a cone-shaped chuck in the form of a nut 54 to engage the periphery of a center hole of a wheel. This locating and holding mechanism is standard.

From FIGURE 9, it will be seen that the stud 50 projects through a slot 56 in plate 30 so that it may move radially to accommodate wheels of different sizes.

The upper bead breaker

Transfixing the two side plates 24 and 26 toward the rear and about one-half way up the frame is a pivot rod 60, referred to for relative location as a far side pivot, on which is mounted a bell crank lever 62–64 formed of a depending arm 62 and a more or less horizontally extending arm 64, the joint between these two arms at the pivot 60 being rigid although the axis of rotation of the bell crank lever is around this far side pivot 60. The bell crank lever is dual in nature in that there is one located at each side of the unit so that the respective arms 62 and 64 parallel each other. See FIGURES 6 and 7.

A small collar 66 on each end of the rod 60 between the levers 64 and the side walls of the frame serves to centralize the assembly. The free ends of the levers 64 each are pivotally associated with a supporting frame member formed of opposed side arms 68, each of which converge upwardly to short dog-legs 70 which in turn converge to a cross bar 72. This framework is rigidified by a cross member in the form of an angle iron 74. Between the converging legs 70 and extending downwardly from bar 72 is a cylindrical tube 76 which is welded to the cross bar 74 for support.

On the top of the plate 72 is mounted the base 78 of a bead breaker support extending upwardly in arcuate arms 80 which support, at their digital ends, a more or less horizontal bead breaker bar having an arcuate blade 82 and a rearwardly extending flange 84 at the top. Affixed to the bottom of the base 78 of this upper unit is a pivot rod 86 shown in dotted lines in FIGURE 3, this pivot rod terminating in a cap 88 which closes the bottom of the cylinder 76.

As shown in FIGURE 4, in a bottom view of this cap 88, radial projections 90 and 92 cooperate with a stop lug 94 on the cross bar 74. A tension spring 96 is anchored at one side to an arm 68 and at the other end affixed to the cap 88. With this arrangement when the parts are positioned with the stop 90 in contact with the lug 94, the spring 96 holds the parts in this relationship since it is in an over-center position. The entire assembly 78–80 has a swiveling relationship to the plate 72 and when the top assembly is moved to the left as shown in FIGURE 2, the spring 96 will pass over the center of the device and then hold the unit in the position shown in FIGURE 2.

A guide and locator mechanism for the bead shoe plate 82 is mounted on the top of the arcuate bars 80. It consists of a plunger element in the form of a rod 100 having a small shoe 102 at the bottom above which is mounted a hook 104 on one side of the rod, the rod being rotatable in a supporting bushing 106. The bushing is mounted on a bifurcate bracket 108 pivoted at 110 on a secondary bifurcate bracket 112, this in turn being pivoted between the arms 80 at 114. A coil spring 116 exerts a forward force on the bracket 112. A spring 118 also relates the two brackets through a bolt 120 which passes through a cross flange 122 on bracket 112 and a tongue member 124 on bracket 108. Both springs 116 and 118 urge the head 106 downward but permit it to be raised relative to the supports 80 if this becomes necessary. The foot member 102 thus can heel into the edge of the wheel rim as shown in FIGURE 3 and serve as a forward guide for the break blade 82 so that the blade will position directly inside the rim and against the tire bead as close to the rim as possible.

As shown in FIGURE 5, a turn of a knob 130 on the rod 100 will shift the hook 104 to the rear where it will engage the edge of a wheel rim and then the blade 82 will contact this hook so that the parts cannot move relative to each other or to the wheel rim, thus locking out the upper bead breaker. The wheel rim is shown at 132, the center of the wheel 134 being locked by the cone 54. The tire is indicated at 136.

Referring again to FIGURE 3, a short spur bar 140 extends upwardly from each lever 68 and the outer end of this bar serves as an anchor point for a pair of counterbalance springs 142 which are anchored at the other end to the respective corners of the bell cranks 62–64.

The lower bead breaker

The anchor point for the lower bead breaker is a pivot pin 150, referred to for relative location as a near side pivot, transfixing the spaced ends of the depending bars 38 of the frame. Pivoted at this near side pivot is a bell crank lever 152–154 formed of a short substantially horizontal arm 152 and a longer depending arm 154, these arms being rigidly connected together and pivoted at the rod 150. At the outer end of the bars 152 which are duplicated on each side of the device is a cross rod 156 which supports two vertical links 158 at the top of which is mounted the bottom bead breaking shoe having an arcuate blade 160 supported by wings 162 extending to each side to support the blade members 160. This mechanism lies within the flared arms 68 and 70 which support the upper bead breaker.

As a guiding mechanism for the blades 160, a vertical blade 170 is pivoted on an arm 172 at 174 in the frame on an axis parallel with a tangent of the support plate 30 at that point. This blade 170 has a leading edge 176 which is adapted to catch one of the blades 160 (see FIGURES 9 and 10) which are positioned on either side of a fixed angled support blade 178 attached to the central supporting plate. The arm 172 extends beyond the pivot point 174 and is connected by a spring 180 and a link 182 to bell crank lever arm 62 (see FIGURE 3).

Thus, it will be seen that the bell crank levers, pivoted respectively at spaced far side and near side axes 60 and 150, each have a first pair of arms 64 and 152, respectively, extending in the same general direction toward the front of the frame generally perpendicular to the axis of plate 30, and a second pair of arms 62 and 154, spaced and generally parallel, depending toward the bottom of the frame. The bead breaking tools 82 and 160 are each supported respectively on members 70 and 158 extending upwardly from the first arms 64 and 152 of the bell crank levers.

The operating mechanism

The bead breaking shoes are operated simultaneously by a piston-cylinder mechanism located in the bottom of the frame housing between the respective second arms of the bell crank levers 62–64 and 152–154. This power unit comprises a floating cylinder 190 having a piston 192 therein with a piston rod 194 extending to the left through the piston head 196. The right-hand end of the cylinder has a head 198 which is pivotally connected to the depending arms 62 of the bell crank lever by a pin 200. A depending lug 202 on the cylinder head limits the left-hand motion of the cylinder by contact with a stop 204. A suitable air supply opening 206 is provided. The lever arms 154 from the lower bead breaker straddle the cylinder and are pivoted at 208 to the ends of a yoke member 210 which spans the left-hand end of the cylinder and overlies the free end of the piston rod at 212.

The arms 154 are connected to each other around the bottom of the cylinder (FIGURE 6) to provide a stirrup 214 which is spaced somewhat below the cylinder. A block member in the form of a lock-out hook 216 pivoted at 218 in a small bracket 220 is positioned such that when moved to the uppermost position shown in FIGURE 8, it will hook into the bight of the stirrup 214 and block the left-hand motion thereof. When the hook is dropped down to its lowermost position, as shown in dotted lines in FIGURE 8, it will clear the stirrup and thus not obstruct the motion. The position of the hook is dependent on a small rod loop lever 222 which can be moved to the upright position as shown in FIGURE 8 to push the hook upwardly or which can lie flat so that the hook is clear. This control loop 222 is actuated remotely by a small arm 224 which projects out of the side 24 of the frame as shown in FIGURE 1.

A cross bar 230 connects the arms 154 above the cylinder and a cross bar 232 lies parallel to bar 230 affixed between arms 62. These cross bars are connected by two large tension springs 234 which float the entire operating assembly.

An air valve 236 actuated by a foot pedal 238 controls air pressure to the air line 206. A limit chain 250 for the upper bead breaker is anchored at 252 on the frame and at 254 on one of the side flanges 70. Also on the side of the frame on plate 24 is mounted a socket receptacle 260 to receive a tire removing and replacing tool 262.

Operation of the device

It will be appreciated that in the operation of the device, tire wheels of varying sizes will be applied to the mount. Thus, it is essential that the bead breaking blades be positionable properly for each particular wheel. Once the bead is broken on a tire a standard tire tool 262 can be used to remove the tire from the wheel and to replace it by catching the head of the iron in a suitable manner on the edge of the wheel rim and fulcrumming the bar on the center post 44.

During the bead breaking operation, once the tire is suitably fastened, the wheel center being held by a lock 54, then the upper bead breaker is brought into position by locating the shoe pad 102 on the edge of the rim as shown in FIGURE 3. This positions the blade 82 properly for the application of power. At the same time, wheel rim may position as shown in FIGURE 10 where the edge of the wheel rim contacts the angle support plate 178. When in this position, the blades 160 will be in a drop position as shown in FIGURE 2, for example. Upon the application of pressure to the right-hand of the cylinder 190, the two bell crank levers 62–64 and 152–154 will start to move in opposite directions. The downward motion of the arms 64 causes a direct pull downwardly on the blade 82 of the upper bead breaker and this blade forces itself between the tire bead and the rim to a bead breaking position. Meanwhile, the springs 116 and 118 permit the relative movement between the blade arms 80 and the support for the guide cylinder 106.

As soon as the bell cranks start to move, a tension is placed on link 182 and spring 180 which causes the arm 172 to pivot about the support 174 raising the guide plate 170 to the extreme upper position where its leading edge contacts the edge of the tire rim as it moves alongside the support plate 178. This is shown more clearly in FIGURE 10, and it will be seen that a portion of the plate 170 which extends beyond the tire rim serves as a guide for the shoe 160 which rests thereon and thus moves the entire lower bead breaker shoe assembly upwardly where the leading edge can engage the tire directly adjacent the bead and just inside the rim.

If some obstruction, such as a wheel balancing lug separates the tire rim from the support plate 178, then the tension on the spring 180 will cause the guide plate 170 to rise further above the normal guide plate 178 and accordingly the bead breaker plate 160 will rise to a higher point and engage properly between the edge of the rim and the tire.

As it has been previously pointed out, should the top bead break first and the bottom bead miss on the first shot, the hook 104 can be turned to the position shown in FIGURE 5 so that the top bead breaker is locked out; then the lower bead breaker can be run again. Similarly, should the lower bead break first, the operator can kick the lever 224 which will raise the loop 222 and the hook 216 will be moved into the path of the stirrup 214 so that the lower bead breaker will not move through its cycle and the upper bead breaker can operate independently. Coil springs 234 serve to return the piston and cylinder to their original position and the tension springs 142 act as a counterbalance on the upper bead breaker to facilitate its handling.

As shown in FIGURE 2, the upper bead breaker can be swung out of the general working area of the frame to permit easy removal and application of wheels and tires. The stop 204 on the bottom channel 28 of the frame limits the total motion of the cylinder to the left.

It will thus be seen that there is described a bead breaking machine wherein both upper and lower beads may be acted upon by a single power device simultaneously or selectively as desired, the structure being readily manipulatable by a single operator and there being an automatic guide means to insure proper guiding of the lower bead breaker to compensate for lack of visibility of the operator and any obstructions which may lodge between the rim and the normal support.

In the appended claims, I have attempted to delineate the novelty of my device over known prior art for the purpose of defining the protected area as well as notifying the public relative to the unprotected area. However, I do intend by this claiming to cover any colorable variations, reversal of parts, or equivalents of the device which are within the scope and spirit of this disclosure and not anticipated by the prior art.

What I claim is:

1. A tire bead breaker comprising a stand, means on an upper portion of said stand for mounting a wheel and tire assembly in the horizontal plane and centered on the vertical axis of said stand, said mounting means comprising:

(a) a tire rim mounting plate and a locking chuck,
 (b) horizontally spaced near and far side pivots disposed below said mounting means and on opposite sides of the axis of the stand,
 (c) a bell crank lever for a lower bead breaking tool, said lever having a first arm projecting laterally from said near side pivot, away from said far side pivot and past the confines of said tire rim mounting plate, said bell crank lever having a second arm projecting downwardly from said near side pivot,
 (d) a lower bead breaking tool pivotally mounted at the end of said first arm and projecting upwardly and toward the tire rim mounting plate for engagement with a lower tire bead,
 (e) a bell crank lever for an upper bead breaking tool, said lever having a first arm projecting from said far side pivot and in the same lateral direction as the first arm of said bell crank lever for the lower bead breaking tool, said first arm of the bell crank lever for the upper bead breaking tool terminating within the confines of said tire rim mounting plate, said bell crank lever for the upper bead breaking tool having a second arm projecting downwardly from said far side pivot,
 (f) an upper bead breaking tool comprising a lower arm having a lower end pivotally mounted on the first arm of the bell crank lever for the upper bead breaking tool, said lower arm extending upwardly and laterally from its pivot and with the direction of its lateral extent being the same as that of the bell crank lever arm upon which it is pivoted, said upper bead breaking tool having an upper arm projecting upwardly from the upper end of its lower arm; and
 (g) a generally horizontal expansible-contractible power device connected between the lower ends of said downwardly projecting bell crank lever arms.

2. An operating mechanism for a tire bead breaking apparatus of the type including a support plate, a chuck, and a pair of bead breaking tools positioned on opposite sides of said plate to move toward a tire and wheel on said plate comprising:

(a) a pair of bell crank levers mounted on spaced pivots and each having a first arm and a second arm, said second arms being generally disposed in the same direction and spaced from each other,
 (b) an expansible-contractible power device mounted on and between said second arms to pivot said bell crank levers,
 (c) a member on each said first arms extending respectively to opposite sides of the support plate and carrying bead breaking tools,
 (d) whereby expansion of said power device causes a bead breaking motion of said tools in the direction of a tire and wheel on said plate,
 (e) one of said second arms of one of said bell cranks comprising a stirrup passing around said power device to have a portion projecting beyond said device, and
 (f) a lock-out means for the member and its associated tool connected to said one of said bell cranks comprising a hook shiftable to a position within the path of said stirrup to block the motion thereof.

3. A device as defined in claim 2 in which said hook is pivoted on a horizontal pivot and movable to engage the bight of said stirrup, and a small lever operable remotely to said hook underlying said hook movable from a flat position to an upright position to lift said hook to an engaging position.

4. An operating mechanism for a tire bead breaking apparatus of the type including a support plate, a chuck, and a pair of bead breaking tools positioned on opposite sides of said plate to move toward a tire and wheel on said plate comprising:

(a) a pair of bell crank levers mounted on spaced pivots and each having a first arm and a second arm, said second arms being generally disposed in the same direction and spaced from each other,
(b) an expansible-contractible power device mounted on and between said second arms to pivot said bell crank levers,
(c) a member on each said first arms extending respectively to opposite sides of the support plate and carrying bead breaking tools,
(d) whereby expansion of said power device causes a bead breaking motion of said tools in the direction of a tire and wheel on said plate, and
(e) a combination guide and lock-out means at one of said tools comprising:
  (1) a bushing positioned adjacent one of said tools having an axis parallel with the general intended motion of said tool,
  (2) means resiliently mounting said bushing relative to the member carrying said tool,
  (3) a locator shaft mounted in and rotatable in said bushing having a control handle at one end and a guide shoe at the other end to contact and locate on the edge of a wheel rim, and
  (4) a projection on one side of said shaft adjacent said shoe and shiftable to a position facing said tool to rest on the edge of a wheel rim and block motion of said tool toward a tire.

5. An operating mechanism for a tire bead breaking apparatus of the type including a support plate, a chuck, and a pair of bead breaking tools positioned on opposite sides of said plate to move toward a tire and wheel on said plate comprising:
(a) a pair of bell crank levers mounted on spaced pivots and each having a first arm and a second arm, said second arms being generally disposed in the same direction and spaced from each other,
(b) an expansible-contractible power device mounted on and between said second arms to pivot said bell crank levers,
(c) a member on each said first arms extending respectively to opposite sides of the support plate and carrying bead breaking tools,
(d) whereby expansion of said power device causes a bead breaking motion of said tools in the direction of a tire and wheel on said plate, and
(e) a guide means at said support plate for a tool engaging a tire adjacent the plate, said guide means comprising:
  (1) a lever mounted adjacent said plate on an axis parallel with a tangent of said plate at that point,
  (2) blade means on said lever shiftable to contact an edge of a wheel rim on said plate and having a portion projecting beyond said rim to contact a tool moving toward said tire to move said tool past the edge of a wheel rim to the bead of a tire, and
  (3) means to shift said lever in response to motion of said bell crank levers to cause said blade means to move against a wheel rim to a guiding position.

6. An operating mechanism for a tire bead breaking apparatus of the type including a support plate, a chuck, and a pair of bead breaking tools positioned on opposite sides of said plate to move toward a tire and wheel on said plate comprising:
(a) a pair of bell crank levers mounted on spaced pivots and each having a first arm and a second arm, said second arms being generally disposed in the same direction and spaced from each other,
(b) an expansible-contractible power device mounted on and between said second arms to pivot said bell crank levers,
(c) a member on each said first arms extending respectively to opposite sides of the support plate and carrying bead breaking tools,
(d) whereby expansion of said power device causes a bead breaking motion of said tools in the direction of a tire and wheel on said plate, and
(e) a guide means at said support plate to a tool engaging a tire adjacent the plate, said guide means comprising:
  (1) a blade having a leading edge to contact the rim of a tire carrying wheel and a guide portion projecting outwardly beyond said plate, and
  (2) means actuable with motion of said tools to move said blade into contact with a wheel rim to guide a tool past the edge of a wheel rim to the bead of a tire.

7. An operating mechanism for a tire bead breaking apparatus of the type including a support plate, a chuck, and a pair of bead breaking tools positioned on opposite sides of said plate to move toward a tire and wheel on said plate comprising:
(a) a pair of bell crank levers mounted on spaced pivots and each having a first arm and a second arm, said second arms being generally disposed in the same direction and spaced from each other,
(b) an expansible-contractible power device mounted on and between said second arms to pivot said bell crank levers,
(c) a member on each said first arms extending respectively to opposite sides of the support plate and carrying bead breaking tools,
(d) whereby expansion of said power device causes a bead breaking motion of said tools in the direction of a tire and wheel on said plate,
(e) the support plate being horizontally disposed and provided with three radial support extensions spaced substantially equidistantly around said plate and having supporting surfaces extending downwardly from the plane of the plate,
(f) one of said tools adjacent said plate having a contact shoe spaced on each side of one of said support extensions, and
(g) a guide means provided at said support plate for said contact shoe, said guide means comprising:
  (1) a blade positioned adjacent said one of said support extensions and movable into contact with the rim of a wheel on said support, said blade having a shoe guide portion extending radially outward beyond said plate to contact a portion of said shoe to guide said shoe to contact a tire bead directly adjacent a wheel rim, and
  (2) means to move said guide means upwardly into contact with a wheel rim simultaneously with the institution of tool movement toward said tire.

8. An operating mechanism for a tire bead breaking apparatus of the type including a support plate, a chuck, and a pair of bead breaking tools positioned on opposite sides of said plate to move toward a tire and wheel on said plate comprising:
(a) a pair of bell crank levers mounted on spaced pivots and each having a first arm and a second arm, said second arms being generally disposed in the same direction and spaced from each other,
(b) an expansible-contractible power device mounted on and between said second arms to pivot said bell crank levers,
(c) a member on each said first arms extending respectively to opposite sides of the support plate and carrying bead breaking tools,
(d) whereby expansion of said power device causes a bead breaking motion of said tools in the direction of a tire and wheel on said plate,
(e) one of said members on said bell crank levers comprising:
  (1) a frame member extending outwardly and axially of said support plate, (2) a shoe supporting extension pivoted on said frame on an axis generally parallel to that of said support plate to permit said extensions to be moved from an operating position to a storage position away from said plate,
(3) means to limit the rotation of said extension at each end of a defined arc, and
(4) resilient means to bias said extension in each of said positions.

9. The tire demonstrating apparatus of claim 1, in which lock-out means for one of said tools is provided which comprises a pivoted block member mounted at the base of said stand, said block member being shiftable to a position within the path of one of the relatively movable parts of said power device, and means operable at a point remote from said block member to shift said block member to blocking position.

10. A tire demounting apparatus comprising a stand, a mounting plate and a locking chuck on said stand for supporting a wheel and tire assembly, spaced bead breaking tools to be positioned respectively on opposite sides of the wheel and tire assembly, an operating mechanism for said tools comprising:
 (a) a movable mounting means for each of said tools,
 (b) an extendible-contractible power device comprising relatively movable parts respectively associated with said mounting means, said power device comprising a piston-cylinder assembly,
 (c) one of said mounting means including a stirrup passing around said assembly having a bight portion projecting beyond said assembly,
 (d) a lock-out means for said particular mounting means comprising a hook shiftable to a position within the path of said stirrup to engage the bight of said stirrup, and
 (e) a lever operable remotely to said hook underlying said hook movable from a flat position to an upright position to lift said hook to an engaging position.

11. A tire demounting apparatus comprising a stand, a mounting plate and a locking chuck on said stand for supporting a wheel and tire assembly, spaced bead breaking tools to be positioned respectively on opposite sides of the wheel and tire assembly, an operating mechanism for said tools comprising:
 (a) a movable mounting means for each of said tools,
 (b) an extendible-contractible power device comprising relatively movable parts respectively associated with said mounting means,
 (c) a combination guide and lock-out means for one of said tools comprising:
 (d) a bushing positioned adjacent one of tools having an axis parallel with the general intended motion of said tool,
 (e) means resiliently mounting said bushing relative to the mounting means carrying said tool,
 (f) a locator shaft mounted in and rotatable in said bushing having a control handle at one end and a guide shoe at the other end to contact and locate on the edge of a wheel rim, and
 (g) a projection on one side of said shaft adjacent said shoe and shiftable to a position facing said tool to rest on the edge of a wheel rim and block motion of said tool toward a tire.

12. A tire demounting apparatus comprising a stand, a mounting plate and a locking chuck on said stand for supporting a wheel and tire assembly, spaced bead breaking tools to be positioned respectively on opposite sides of the wheel and tire assembly, an operating mechanism for said tools comprising:
 (a) a movable mounting means for each of said tools,
 (b) an extendible-contractible power device comprising relatively movable parts respectively associated with said mounting means,
 (c) a guide means positioned at said mounting plate for a tool engaging a tire adjacent said plate, said guide means comprising:
 (d) a lever mounted adjacent said plate on an axis parallel with a tangent of said plate at that point,
 (e) blade means on said lever shiftable to contact an edge of a wheel rim on said plate and having a portion projecting beyond said rim to contact a tool moving toward said tire to move said tool past the edge of a wheel rim to the bead of a tire, and
 (f) means to shift said lever in response to motion of said power device to cause said blade means to move against a wheel rim to a guiding position.

13. A tire demounting apparatus comprising a stand, a mounting plate and a locking chuck on said stand for supporting a wheel and tire assembly, spaced bead breaking tools to be positioned respectively on opposite sides of the wheel and tire assembly, an operating mechanism for said tools comprising:
 (a) a movable mounting means for each of said tools,
 (b) an extendible-contractible power device comprising relatively movable parts respectively associated with said mounting means,
 (c) a guide means positioned at said mounting plate for a tool engaging a tire adjacent said plate, said guide means comprising:
 (d) a blade having a leading edge to contact the rim of a tire carrying wheel and a guide portion projecting outwardly beyond said plate, and
 (e) means actuable with motion of said tools to move said blade into contact with a wheel rim to guide a tool past the edge of a wheel rim to the bead of a tire.

References Cited by the Examiner
UNITED STATES PATENTS

| | | | |
|---|---|---|---|
| 2,534,950 | 12/1950 | Butterfield et al. | 157—1.28 |
| 3,008,512 | 11/1961 | Foster | 157—1.28 |
| 3,032,094 | 5/1962 | Bishman | 157—1.28 |
| 3,064,718 | 11/1962 | Brosene | 157—1.28 |

FRANK E. BAILEY, *Primary Examiner.*